United States Patent [19]

Le et al.

[11] Patent Number: 5,158,264
[45] Date of Patent: Oct. 27, 1992

[54] PARALLELL EXPANDING GATE VALVE

[75] Inventors: Tri C. Le, Sugarland; Paul L. Tasson, Missouri City; Scott K. Beall, Sugarland, all of Tex.

[73] Assignee: Baroid Technology, Inc., Houston, Tex.

[21] Appl. No.: 660,348

[22] Filed: Feb. 22, 1991

[51] Int. Cl.$^5$ .............................................. F16K 3/18
[52] U.S. Cl. .................................... 251/198; 251/193
[58] Field of Search .............. 251/197, 198, 193, 195, 251/202

[56] References Cited

U.S. PATENT DOCUMENTS

| | | | |
|---|---|---|---|
| 1,624,465 | 4/1927 | Black | 251/198 X |
| 2,039,465 | 5/1936 | Vetrano | 251/196 |
| 2,103,536 | 12/1937 | Inge | 251/161 |
| 2,282,553 | 5/1942 | Banowetz | 251/198 |
| 2,654,563 | 10/1953 | Mueller et al. | 251/198 |
| 2,793,831 | 5/1957 | Doster | 251/197 |
| 3,039,734 | 6/1962 | Blevans | 251/202 X |
| 3,125,323 | 3/1964 | Heinen | 251/197 |
| 3,434,692 | 3/1969 | Tillman, III | 251/202 |
| 4,471,943 | 9/1984 | Nelson | |
| 4,625,942 | 12/1986 | Nelson | |

OTHER PUBLICATIONS

W-K-M Division (acf) "W-K-M Pow-R-Seal API Gate Valves", pp. 7349-7350 and 73.

Primary Examiner—John C. Fox
Attorney, Agent, or Firm—Browning, Bushman, Anderson & Brookhart

[57] ABSTRACT

Apparatus and methods for sealing a parallel expanding gate valve are provided using upper and lower wedges separate from and located between the gate segments. The gate segments are symmetrical with respect to each other and have inner upper and lower tapered surfaces. Inclined surfaces on the upper wedge press the inner upper tapered surfaces of the gate segments. The inner lower tapered surfaces of the gate segments also press against inclined wedging surfaces on the lower wedge. This wedging action forces the gate segments outward with respect to each other and with substantial force against sealing assemblies to close and seal the gate valve.

14 Claims, 2 Drawing Sheets

PARALLELL EXPANDING GATE VALVE

BACKGROUND OF THE INVENTION

1. Field of the Invention

The present invention relates generally to gate valves and, more particularly, relates to a specific type of gate valve referred to as a parallel expanding gate valve.

2. Description of the Prior Art

Gate valves are generally comprised of a body having a central axis aligned with inlet and outlet passages, and a space between the inlet and outlet passages in which a slide, or gate, may be moved perpendicular to the central axis to open and close the valve. In the closed position, flat surfaces on the gate typically seal against sealing rings which surround the fluid passage through the valve body.

Gate valves have been used for centuries to control the flow of a great variety of fluids. Often the fluid to be controlled by the gate valve is under pressure, in which case it has been found difficult to obtain a completely tight seal which will remain fluid tight after the valve has been in use for some time. Exemplary prior art gate valves and gate valve seats are disclosed in U.S. Pat. Nos. 4,471,943 and 4,625,942.

Frequently the sealing rings used in gate valves are composed of various types of resilient elastomeric materials. It can be appreciated that sealing rings having a large sealing surface area and having high compressibility against the gate sealing surfaces can be highly effective in forming a fluid-tight seal. However, these same qualities in the sealing rings also result in substantial wear of the elastomeric sealing rings due to the frictional movement of the gate. This high friction makes operation of the valve very difficult and requires a large and expensive valve operator. Various techniques have been developed to circumvent these problems, including providing very smooth surfaces to improve sealing and reduce friction, lubricating the sealing surfaces, maintaining close tolerances and accurate alignments, and pressure balancing against the seals using relief pressure ports. These techniques are often expensive and do not always provide the reliability, operating range, and long life desired for industrial gate valves. Additionally, the elastomeric materials useful for effecting seals are not always suitable for control of all types of fluids, and may have operating temperature range limitations.

Another approach to solving the problem of sealing in gate valves involves using expandable gates. In an expandable gate valve, the gate remains collapsed while moving between open and closed position, but expands when placed opposite the sealing rings to effect a fluid-tight seal. In this way it is possible, in general, to avoid the high friction which wears on the sealing rings and makes operation of the valve difficult. Parallel expanding gates apply a considerable axially directed force against the sealing rings so that it is possible to obtain a fluid tight seal using metal seals or metal seals having some type of protective coating but having virtually no resilience. For this reason, parallel expanding gate valves may be used with metal seals in applications having relatively wide temperature operating ranges and in controlling fluids which may have a tendency to deteriorate elastomeric materials.

One presently available parallel expanding gate valve has a gate which is composed of two segments adjacent to and substantially parallel with each other. The inner sides of each segment have mating inclined surfaces and the outer sides of each segment form sealing surfaces. An operating stem is attached to one of the segments, which may be called the gating segment, and a spring holds the segments together in a collapsed position while the gate is moving from the opened to the closed valve positions.

To close the above described parallel expanding gate valve, the operating stem pushes the gating segment downwards until the other segment, which is longer than the gating segment, reaches a lower stop. As the operating stem continues to press downwards on the gating segment, the two segments expand axially outward with respect to each other due to their inclined inner surfaces, and press their sealing surfaces against the seals to form a fluid-tight seal. Similarly, to open the valve, the operating stem pulls the gating segment until the longer segment reaches an upper stop. The gating segment is pulled further so that the gate expands due to the inclined surfaces and presses against the seals. An aperture through the gate is, at this point, now aligned with the passage through the bore to allow fluid flow through the valve.

Significant problems exist with this type of parallel expanding gate valve. While the gate is moving particles or debris in the fluid, often called fill, may collect in the valve body at the lower stop to effectively alter the stop point. Since the gate now stops at a point at which it was not designed to stop, the forces acting on the sealing surfaces which result from the inner inclined surfaces of the segments may no longer be as uniform as they were designed to be. The segments may press harder against one part of the seals than another part so that the seal may not be as tight as normally it would be. This will be especially true if there has been some wear on the seals which may have been caused by friction forces which occur during the continued downward movement of the gate while the segments are expanding. Also, due to the sometimes very high downward forces acting on the longer segment at the lower stop or stop wall, some gouging, digging or general deformation may occur at the stopping edge of the longer segment or at the stop wall. This occurrence also effectively alters the correct stop point and tends to create a similar unequal distribution of force against the sealing rings, as previously described.

In this prior art parallel expanding gate valve, because the segments press directly against each other, any problem that occurs to one segment will have a direct effect on the other segment. If, for instance, one segment is somehow bent or tilted and loses its seal, the other segment will be affected so that its seal may also be lost.

There is also a problem with this parallel expanding gate valve relating to the outward movement of the gates with respect to each other. As the segments are expanding outwardly away from each other, to prevent bending of the operating shaft, which may be attached with threads to the gating segment, generally the longer segment is the segment designed to be the segment which moves outwardly and the gating segment preferably remains substantially stationary with respect to the axis of the operating shaft. However, because the longer segment is also pressing downwards against the stop wall, friction problems may develop between the stopping edge of the longer segment and the stop wall as the longer segment slides outward. These problems can result in gouging or sticking of the long segment during its outward movement. The collection of foreign particles in the body exacerbate the sticking and gouging. If, due to fill or gouging, the bottom edge of the longer segment is prevented from completing its horizontal movement, some bending or tilting may occur which, as explained previously, could affect the seal of both segments. Note that with this parallel expanding gate some bending of the operating stem is inevitable because the gating segment to which the operating stem is secured must also expand outward to some degree to effect a seal.

While the gating segment is designed to remain substantially in line with the operating stem, during the expanding process it continues to move along the operating stem axis to effect expansion. This means that wear will occur primarily on one seal only due to the considerable friction created between the gating segment and seal as it moves until it is effectively stopped by friction forces from moving further. This asymmetrical wear on one seal may affect the tightness of the other seal if there is any tilting of the gating segment due to wear on the gating segment seal because of the direct relationship between the gating segment and the longer segment.

Another related problem which may arise in a presently available parallel expanding valve is that the gating segment may "bottom out" or hit the stop wall prior to the occurrence of sufficient expansion of the segments to effect sufficiently tight seals. This can occur due to wear on the seals or sealing surface or due to a possible change in the stop point as previously discussed. This problem becomes more pronounced as the angles of the inner surfaces (with respect to a line perpendicular to the central axis) become small. Smaller angles have the advantage of generally providing a greater expansion force but the disadvantage of requiring more travel of the stem and friction between moving parts.

It will be appreciated that when problems occur which are the result of damage of the stop wall, which is typically an integral part of the valve body, repair will then probably require changing out the entire body of the valve.

In summary, the presently existing parallel expanding gate valves are susceptible to sealing problems resulting from normal fill in the valve body, gouging or distortion at the stop wall and on the stopping edge of the longer segment, possible bending of the longer segment and/or the operating stem during expansion of the gate, and wear on the seals or sealing surfaces.

Consequently, a need exists for improvements in parallel expanding gate valves which will result in greater reliability and dependability of operation.

SUMMARY OF THE INVENTION

In a preferred embodiment, the present invention provides for two separate wedge shaped bodies distinct from the segments of the gates to allow operation of the parallel expanding gate in a manner designed to satisfy the aforementioned needs. One of the wedges is movable, generally connected to the operating stem, and the other wedge is normally fixed to the valve body. The two wedges are located centrally between two gate segments. The gate segments are preferably symmetrical counterparts or mirror images of each other, rather than necessarily different as in the prior art parallel expanding gate valves—a factor which allows for lower manufacturing costs. The wedges act on each gate independently so that problems which occur in one gate segment do not directly affect the other gate segment.

Rather than requiring a longer gate segment to hit a stop before expansion occurs, a preferred embodiment of the parallel expanding gate of the present invention uses a wedge affixed to the valve body to effect halting and spreading of the gate segments. For this reason, problems of fill and gouging at the stopping point which occur in the prior art are reduced. Considerable fill may occur in the valve body of the present invention without affecting the sealing action. Problems with gouging or deformation of the stopping wall or stopping edge of the longer segment are thus avoided because a stopping wall is no longer required. A movable wedge, located on the operating stem, is preferably provided to push the gate segments toward the fixed wedge and thereby create the expansion effect.

Wear on the seals or the sealing surfaces does not result in uneven application of forces when the gate does not come to rest in the approximate position at which it was originally designed to halt. This is because the application of force by the two separate wedges of the present invention and placed at two different locations, having at least four different wedging surfaces, results in more even expansion forces acting on the gate segments. The design of the present invention is, therefore, effectively wear compensating.

Additionally, wear is reduced because of the more even application of forces which prevents any tendencies towards tilting which would cause non-uniform forces acting on the sealing surfaces. As well because of the additional surfaces, the same low angles which are useful to additional outward sealing force require less travel between the moving parts parallel to the stem axis and this also reduces wear on the sealing surfaces. That is, for the same amount of axial movement of the stem, the additional wedging surfaces results in greater outward movement or expansion of the gates.

Additionally, because there is no necessary stopping wall or longer segment with a stopping edge, as in the prior art, there is little or no problem with "bottoming out" so that the valve cannot seal as may occur with the prior art expanding gate valves.

Moreover, the operating stem in the present invention is connected to one of the centrally located wedges which wedge moves only axially with respect to the axis of the operating shaft. Hence, there are no problems with bending of the operating stem when expansion occurs which need to be designed around as there are in the prior art parallel expanding gate valves as previously explained.

It is an object of the present invention to provide a parallel expanding gate valve with improved performance by using a centrally located and separate wedging body or bodies to effect the expansion of the gate valves.

It is a feature of the invention to allow use of a centrally located wedging body attached to the operating stem so that problems of bending of the operating stem are completely avoided.

It is an advantage of the present invention that mirror image gate segments can be used so that manufacturing costs are lowered.

In summary, normal fill is not a problem to the design of the present invention. Gouging or deformation of stop walls or stop edges does not generally occur because the stop walls or stop edges are not a requirement of the present invention. Problems associated with wear on the sealing surfaces or seals are minimized. Bending of the longer segment or operating stem does not occur because a longer segment is not required and neither gate segment is required to slide along a stop wall as is necessitated by the prior art parallel expanding gate valves.

DETAILED DESCRIPTION OF THE PREFERRED EMBODIMENTS

Figure 1:
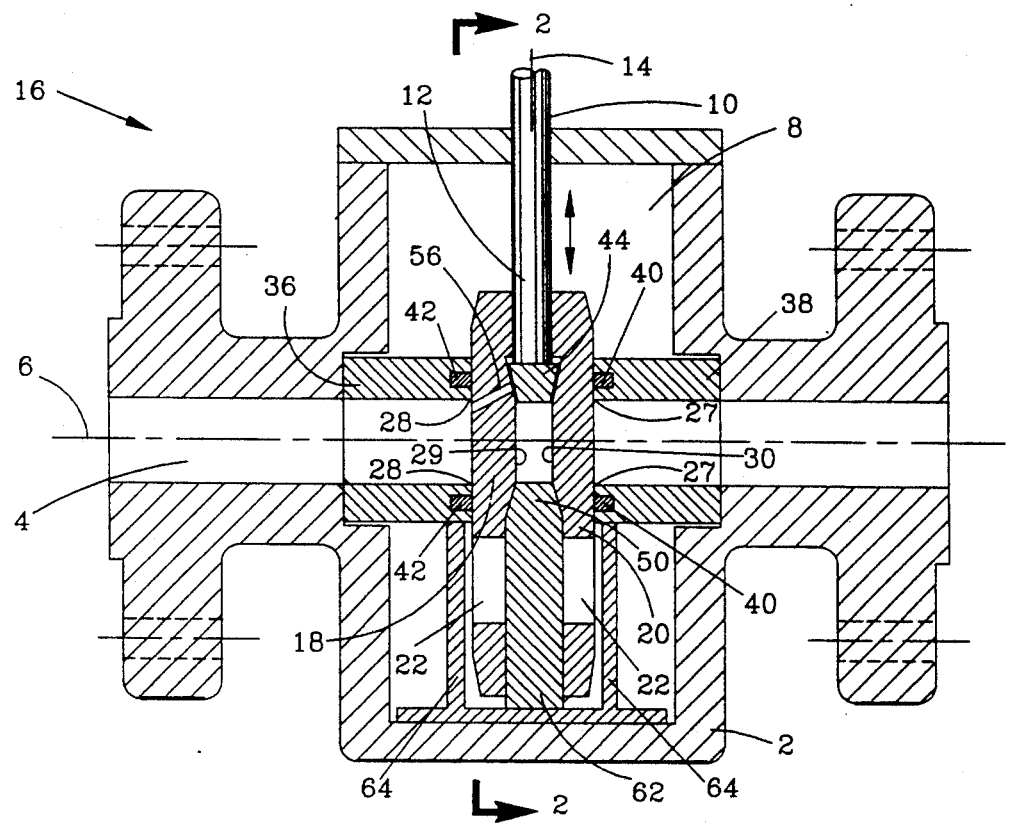
FIG. 1 is a side elevational view, partially in cross section, of a parallel expanding gate valve of the present invention.
Figure 2:
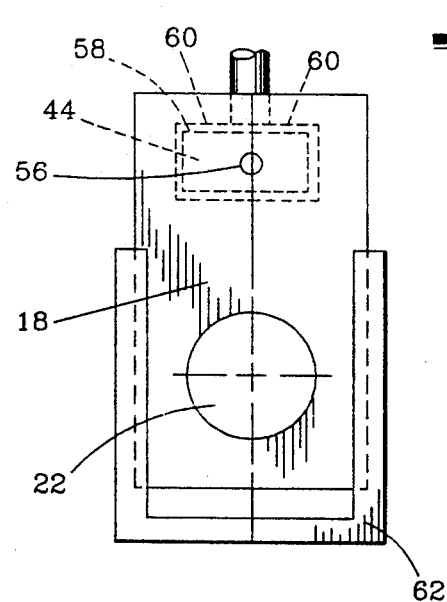
FIG. 2 is a pictorial view along the lines 2—2 of FIG. 1 showing a gate segment.

Referring now to the drawings, and more particularly to FIG. 1, there is shown a preferred embodiment of a parallel expanding gate valve, generally designated 16, according to the present invention. Valve body 2 includes bore 4 with bore central axis 6 extending through valve body 2. Valve body 2 also includes cavity 8 which intersects bore 4. Operating stem 10 has a lower end 12 disposed within cavity 8. Operating stem 10 is substantially perpendicular to bore central axis 6. Operating stem 10 moves along its stem axis 14 to open and close the valve 16.

Figure 3:
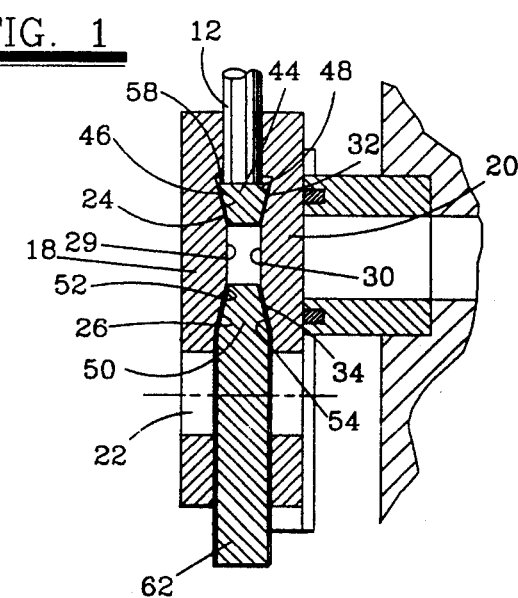
FIG. 3 is a side elevational view, partially in section, showing the expanding gates and two wedges as generally shown in FIG. 1.

Upper wedge 44 (FIG. 3) is connected to operating stem lower end 12. Upper wedge 44 has first and second inclined wedging surfaces 46 and 48. Upper wedge 44 is positioned between first gate segment 18 and second gate segment 20 and structurally interconnects operating stem 10 to first and second gate segments. Upper wedge 44 further includes upper supporting surface 58 which can press against first and second gate inwardly projecting lip surfaces 60 to pull said first 18 and second 20 gate segments along stem axis 14 until through apertures 22 of first and second gate segments 18 and 20 are aligned with bore 4 to open valve 16.

First gate segment 18 has a first sealing surface 28 and a first inner surface 29. First inner surface 29 has a tapered upper portion 24 and a tapered lower portion 26. Likewise second gate segment 20 has a second sealing surface 27 and a second inner surface 30. Second inner surface 30 has a tapered upper portion 32 and a tapered lower portion 34. First sealing surface 28 is pressed with substantial force against first sealing assembly 36 to form a fluid tight seal as explained hereafter. First sealing assembly 36 includes a first seal 42 which can be of elastomeric material, metal, metal coated with resin, or some other material or combination of materials. Due to the substantial force with which the first sealing surface 28 is pressed against the first sealing assembly 36, it is not necessary for the first seal 42 to be made of resilient material in order that a fluid tight seal is formed. Similarly, second sealing surface 27 is pressed against second sealing assembly 38 to form a fluid tight seal with second seal 40 which is generally composed of the same materials as first seal 42.

Lower wedge 50 includes third inclined wedging surface 52 and fourth inclined wedging surface 54. Lower wedge 50 is attached to inner gate guide 62 and thereby secured to valve body 2. Inner gate guide 62 is generally fixed to outer gate guide 64.

Expanding gate valve 16 operates to close bore 4 by moving operating stem 12 along its stem axis 14 in the direction of lower wedge 50. When tapered lower portions 26 and 34 reach third and fourth inclined wedging surfaces 52 and 54, the tapered lower portions 26 and 34 begin to spread axially outward with respect to each other. First and second inclined wedging surfaces 46 and 48 also act on the tapered upper portions 24 and 32. This wedging process causes first gate segment 18 and second gate segment 20 to move axially away from each other and press with substantial force against first and second sealing assemblies 36 and 38 respectively to seal expanding gate valve 16. The angles, with respect to a line perpendicular to the central axis, of the inclined wedging surfaces 46,48,52,54 can be designed to place more force on one side or part of the sealing assemblies 36 and 38 than another if experience proves that to be useful, although in this preferred embodiment the angles are substantially equivalent to each other. In the prior art expanding gate valve, this flexibility is not available. Also it is anticipated, in some instances, that the wedging surfaces may have somewhat different angles than the tapered surfaces although in this preferred embodiment the angles of the wedging surfaces are the same as or matched to those of the respective tapered surfaces. The concept of multiple tapered surfaces results in greater expansion with less motion in the direction parallel to stem axis 14 yielding greater sealing pressure with reduced likelihood of having gate segments 18 and 20 "bottom out" prior to forming a seal. A spring (not shown) may generally be used to hold gate segments 18 and 20 in a collapsed state prior or subsequent to expansion.

A pressure port 56 is included in first gate segment 18 to allow pressure equalization between the bore 4 and the cavity 8. Generally the pressure port 56, if used, is located in the upstream gate segment. If the pressure is bled off on the upstream portion of bore 4, a differential pressure between that of cavity 8 and the bore 4 may exist so that additional force is required to open expanding gate valve 16. Equalizing the pressure in the cavity 8 and the upstream portion of bore 4 will reduce the drag of the gate segment 18, in this case, against the sealing assembly 36 and seat 42 to reduce the force needed to open expanding gate valve 16. The upper wedge 44 seals pressure port 56 when the expanding gate valve 16 is closed and opens pressure port 56 when upper wedge 44 is pulled away from first gate segment 18 by operating stem 10.

Figure 4:
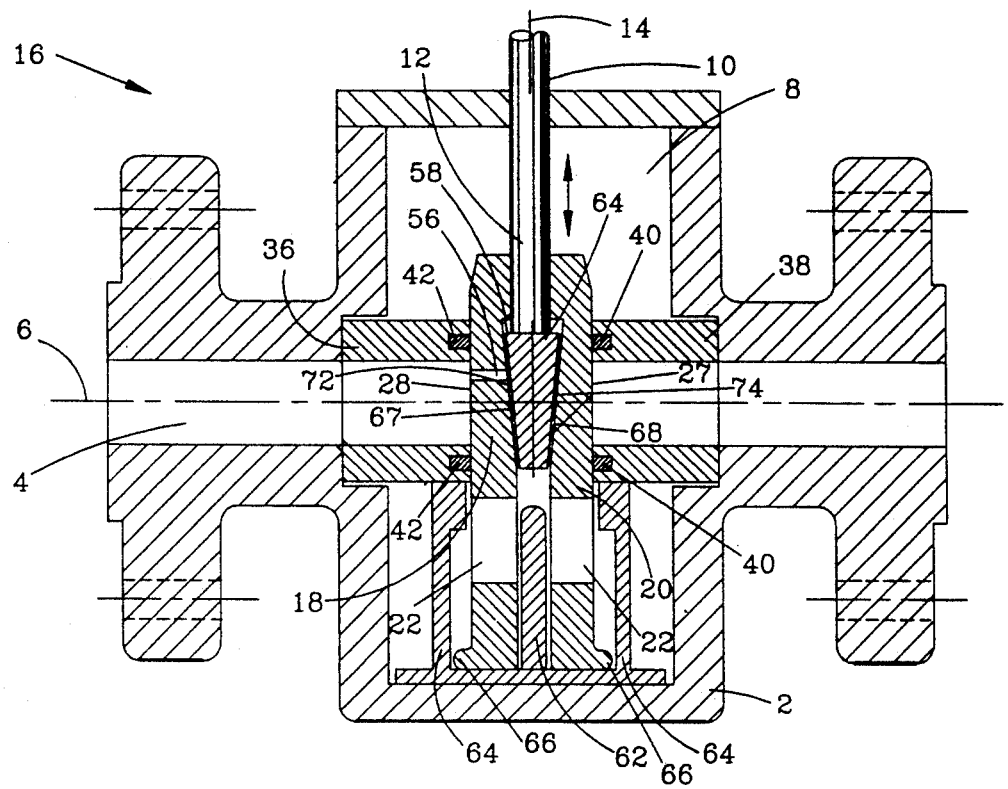
FIG. 4 is a side elevational view, in section, showing an alternate embodiment of a parallel expanding gate valve of the present invention incorporating a single movable wedge.

FIG. 4 shows an alternative embodiment, according to the present invention, incorporating a single movable wedge 64 with wedging surfaces 72 and 74. In this embodiment, first and second gate segments 18 and 20 stop at the bottom of gate guide 62 prior to being wedged apart by wedge 64 pressing against tapered inner gate surfaces 67 and 68. Having both gates come to a complete halt in the direction parallel to the stem axis means that as expansion occurs there is no relatively high friction sliding of the gate segments 18 and 20 with respect to the sealing assemblies 36 and 38 that may cause wear on the sealing rings 40 and 42 as compared to the prior art valve in which asymmetrical wear occurs primarily on the gating segment. Gate skids 66 are used to prevent gouging of the gate segments 18 and 20 against outer gate guide 64 assembly as the gate skids slide along outer gate guide 64 assembly while the gate valve is expanding by dispersing the downward forces over a larger area. This embodiment may be more suitable for high pressure applications since smaller angles which produce the higher sealing forces used for higher pressure applications can have the disadvantage of additional travel of the stem and resulting additional wear between parts which move parallel with stem axis. Inner and outer gate guides 62 and 64 respectively may be removable so that, if damaged, it is not necessary to replace the entire valve body 2.

Figure 5:
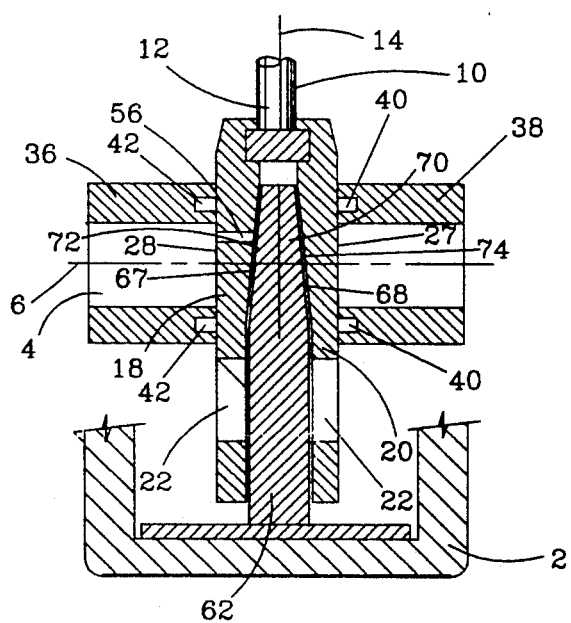
FIG. 5 is a side elevational view, in section, showing another embodiment of a parallel expanding gate valve of the present invention incorporating a single fixed wedge.

FIG. 5 shows another possible embodiment of the present invention incorporating a single fixed wedge 70. Wedge 70 is secured to valve body 2 through inner gate guide 62. Wedge 70 operates to wedge gate segments 18 and 20 apart when operating stem 10 moves along its stem axis in the direction of wedge 70 in a manner that has been explained in the previous embodiments. The advantage of this embodiment over the prior art is that no sliding of a longer segment along a stop wall occurs that may result in bending or gouging of the longer segment. Also, this embodiment offers greater resistance to fill problems than the prior art since there is no stop wall against which the gate segments 18 and 20 must come to a stop.

It can be seen that the preferred embodiments of FIG. 4 and FIG. 5 are generally included, along with their relative advantages over the prior art, in the embodiment of FIG. 1.

It is thought that the parallel expanding gate valve and methods of the present invention and many of its attendant advantages will be understood from the foregoing description and it will be apparent that various changes may be made in the form, construction, and arrangement of the parts thereof without departing from the spirit and scope of the invention or sacrificing all of its material advantages, the form hereinbefore described being merely a preferred or exemplary embodiment thereof.

What is claimed is:

1. An expanding gate valve, comprising:

a valve body, said valve body having a bore, said bore extending though said valve body and having a central axis, said valve body further defining a cavity having an axial width and intersecting said bore;

an operating stem, said operating stem having a lower end movable within said cavity of said valve body and having a stem axis substantially perpendicular to said central axis of said bore, said operating stem being movable along said stem axis to open and close said valve;

first and second gate segments each interconnected to said stem and independently movable in a direction substantially parallel to said central axis of said bore, each of said first and second gate segments containing a through aperture and being additionally movably disposed within said cavity of said body for positioning said first and second gate segments across said bore to close said valve and for positioning said through apertures along said central axis to open said valve;

said first gate segment having a first inner tapered surface facing said second gate segment, and a first outer sealing surface opposite said first inner tapered surface and perpendicular to said centered axis;

said second gate segment having a second inner tapered surface facing said first gate segment, and a second outer sealing surface opposite said second inner surface and perpendicular to said central axis;

first and second sealing assemblies, said first and second sealing assemblies each surrounding said bore in said valve body, said first and second gate segments being located between said first and second sealing assemblies, said first sealing assembly having a first seating surface perpendicular to said central axis and facing said first sealing surface of said first gate segment, and said second sealing assembly having a second seating surface perpendicular to said central axis and facing said second sealing surface of said second gate segment;

said first and second seating surfaces being axially spaced apart less than the axial width of said cavity, such that said first and second sealing surfaces of said first and second gate segments remain in engagement with said first and second seating surfaces as said gate segments are moved within said cavity from a valve closed position to a valve open position;

a pressure port in communication with the valve body bore when the valve is in the closed position and extending through one of said first and second gate segments and passing through a respective one of the first and second inner tapered surfaces;

a wedge within said valve body cavity, said wedge being disposed between said first and second gate segments, said wedge having first and second inclined wedging surfaces slidably positioned adjacent said tapered first and second inner surfaces, respectively, such that as said stem moves along said stem axis said wedge is displaced along said stem axis with respect to both said first and second gate segments to urge said first and second gate segments axially outward against said first and second sealing assemblies to form fluid tight seals between said first sealing surface and said first sealing assembly and between said second sealing surface and said second sealing assembly to close said valve; and the respective one of the inner tapered surfaces including said pressure port being a planar surface having a taper matched to the inclination of a mating one of the first and second inclined wedging surfaces, such that the pressure port is sealed when said gate valve is closed by engagement of the respective one planar tapered surface with the mating one of the inclined wedging surfaces, and said pressure port is unsealed as said stem is displaced along said stem axis to disengage the respective one planar tapered surface and the mating inclined wedging surface.

2. An expanding gate valve as recited in claim 1, further comprising:

said wedge having a movable wedge portion attached to said operating stem, said movable wedge portion also being attached to said gate segments, said movable wedge portion interconnecting said operating stem with said gate segments.

3. An expanding gate valve as recited in claim 2, further comprising:

said wedge having a supporting surface, said first and second gate segments having first and second inwardly projecting lip segments, said supporting surface of said wedge engaging said inwardly projecting lip segments such that as said stem moves along said stem axis said supporting surface presses against said first and second inwardly projecting lip segments to lift said first and second gate segments.

4. An expanding gate valve as recited in claim further comprising:

said wedge including a fixed wedge portion secured to said valve body.

5. An expanding gate valve as recited in claim 1, further comprising:

said first and second gate segments being symmetrical counterparts with respect to each other and located adjacent to each other.

6. An expanding gate valve, comprising:

a valve body, said valve body having a bore, said bore extending through said valve body and having a central axis, said valve body further defining a cavity intersecting said bore;

an operating stem, said operating stem having a lower end movable within said cavity of said valve body and having a stem axis substantially perpendicular to said central axis of said bore, said operating stem being movable along said stem axis to open and close said valve;

first and second gate segments each interconnected to said stem, each of said first and second gate segments containing a through aperture and being movably disposed within said cavity of said body for positioning said first and second gate segments across said bore to close said valve and for positioning said through apertures along said central axis to open said valve;

said first gate segment having a first inner surface facing said second gate segment and including a tapered first upper surface, and said first gate segment having a first outer sealing surface opposite said first inner surface;

said second gate segment having a second inner surface facing said first gate segment and including a tapered second upper surface, and said second gate segment having a second outer sealing surface opposite said second inner surface;

first and second sealing assemblies, said first and second sealing assemblies surrounding said bore in said valve body, said first and second gate segments being located between said first and second sealing assemblies, said first sealing assembly facing said first sealing surface of said first gate segment and said second sealing assembly facing said second sealing surface of said second gate segment;

an upper wedge movable within said valve body cavity in response to said operating stem, said upper wedge being disposed between said first and second gate segments, said upper wedge having first and second inclined wedging surfaces, said first and second wedging surfaces of said upper wedge slidably positioned adjacent said first and second tapered upper surfaces of said first and second inner surfaces, respectively; and a pressure port through one of said gate segments, said inner tapered surface of said one gate segment including said pressure port having a taper matched to the inclination of a respective mating one of the first and second inclined wedging surfaces, said pressure port communicating between said valve body bore and said valve body cavity when said valve is in the open position, said pressure port being sealed by sealing engagement of the respective inclined wedging surface on said upper wedge and the mating inner tapered surface on said one gate segment when said valve is in the closed position, said pressure port being unsealed as said upper wedge moves upward with respect to said valve body along said stem axis.

7. An expanding gate valve as recited in claim 6, further comprising:

said first and second gate segments being symmetrical counterparts with respect to each other and located adjacent to each other.

8. An expanding gate valve as recited in claim 6, further comprising:

said upper wedge having a movable wedge portion attached to said operating stem, said upper wedge also being attached to said gate segments, said movable wedge portion interconnecting said operating stem with said gate segments.

9. An expanding gate valve as recited in claim 8, further comprising:

said upper wedge having a supporting surface, said first and second gate segments having first and second inwardly projecting lip segments, said upper wedge supporting surface matching said inwardly projecting lip segments so that as said stem moves along said stem axis said upper wedge supporting surface presses against said first and second inwardly projecting lip segments to lift said first and second gate segments.

10. A method for forming an expanding gate valve, comprising the following steps:

(a) disposing a lower end of an operating stem within a cavity of a valve body such that it is moveable along the axis of said operating stem and substantially perpendicular to a central axis of a central bore extending through said valve body;

(b) interconnecting first and second gate segments to said operating stem such that said valve can be opened by moving said stem to position through apertures in said first and second gate segments in alignment with said central axis of said bore, and closed by moving said stem to position first and second outer sealing surfaces on said first and second gate segments against respective first and second sealing assemblies surrounding said bore;

(c) forming first and second inner tapered surfaces on said first and second gate segments, respectively;

(d) forming first and second outer sealing surfaces on said first and second gate segments each opposite the respective inner tapered surface and perpendicular to said central axis;

(e) forming first and second sealing assemblies on said valve body and each surrounding said bore, said first and second gate segments being located between said first and second sealing assemblies;

(f) forming first and second seating surfaces on said first and second sealing assemblies, respectively, each seating surface being perpendicular to said central axis;

(g) providing a pressure port extending through one of said gate segments for fluid communication between said valve body bore and said valve body cavity; and (h) disposing a wedge having first and second inlcined wedging surfaces within said cavity in said valve body and between said first and second gate segments, said wedge being positioned for slidably engaging said first and second inner tapered surfaces and selectively sealing said pressure port by sealing engagement of a respective inner tapered surface and a respective inclined wedging surface when said valve is closed, said wedge being movable with respect to said first and second gate segments so that when said stem moves along said stem axis then said first and second inner tapered surfaces engage said wedge to axially urge said first and second respective gate segments outward with respect to each other along said bore central axis pressing said first and second sealing surfaces against said first and second sealing assemblies, respectively, in order to form fluid tight seals between said first sealing surface and said first sealing assembly and between said second sealing surface and said second sealing assembly whereby said valve is sealed, and said wedge unsealing said pressure port when said valve is opened by disengaging the respective inner tapered surface and the respective inclined wedging surface.

11. A method for forming an expandable gate valve as recited in claim 10, wherein steps (c) and (d) further comprise:

disposing upper and lower wedges between said first and second gate segments within said cavity of said valve body;

forming first and second inclined wedging surfaces on said upper wedge;

forming third and fourth inclined wedging surfaces on said lower wedge;

forming first and second tapered inner surfaces on upper portions of said first and second gate segments; and forming third and fourth tapered inner surfaces on lower portions of said first and second gate segments, such that when said first and second inclined wedging surfaces are pressed against said first and second tapered inner surfaces of said gate segments then said third and fourth tapered inner surfaces of said gate segments press against said third and fourth inclined wedging surfaces of said lower wedge whereupon said first and second gate segments are urged axially outward with respect to each other.

12. A method for forming an expandable gate valve as recited in claim 10, wherein step (d) further comprises:

attaching a movable wedge portion to said operating stem to form an interconnection between said operation stem and said gate 13. A method for forming an expandable gate valve as recited in claim 10, wherein step (d) further comprises:

securing a fixed wedge portion to said valve body.

14. A method for forming an expandable gate valve as recited in claim 10, wherein step (b) further comprises:

forming first and second gate segments to be symmetrical counterparts of each other; and placing said first and second gate segments adjacent to each other.

* * * * *

UNITED STATES PATENT AND TRADEMARK OFFICE
CERTIFICATE OF CORRECTION

PATENT NO. : 5,158,264
DATED : October 27, 1992
INVENTOR(S) : Tri C. Le, et al.

It is certified that error appears in the above-identified patent and that said Letters Patent is hereby corrected as shown below:

On title page, item [54], and col. 1, change "PARALLELL" to --PARALLEL--.

Column 9, line 11, (Claim 4, line 1) insert --1,-- after the word "claim".

Column 12, line 23, (Claim 12, line 5) insert --segments.-- after the word "gate".

Signed and Sealed this

Fifth Day of October, 1993

Attest:

BRUCE LEHMAN

*Attesting Officer*     *Commissioner of Patents and Trademarks*